United States Patent [19]

Seymour et al.

[11] Patent Number: 5,724,259
[45] Date of Patent: Mar. 3, 1998

[54] SYSTEM AND METHOD FOR MONITORING COLOR IN A PRINTING PRESS

[75] Inventors: John C. Seymour, Jefferson; Jeffrey P. Rappette, Waukesha; Frank N. Vroman, Cedarburg; Chia-Lin Chu, Brookfield; Bradly S. Moersfelder, Waukesha; Michael A. Gill, Oconomowoc; Karl R. Voss, Wauwatosa, all of Wis.

[73] Assignee: Quad/Tech, Inc., Sussex, Wis.

[21] Appl. No.: 434,928

[22] Filed: May 4, 1995

[51] Int. Cl.⁶ .......... G01N 21/47; G01N 21/88; G06F 15/00
[52] U.S. Cl. .......... 364/526; 364/525; 382/199; 250/548; 358/518
[58] Field of Search .......... 382/199, 266, 382/112, 162–167, 17, 18, 8; 250/559.01, 559.11, 571, 548; 364/526, 525, 518; 356/407; 358/518

[56] References Cited

U.S. PATENT DOCUMENTS

| | | | |
|---|---|---|---|
| 3,629,952 | 12/1971 | Overly et al. | 34/156 |
| 3,638,330 | 2/1972 | Stout | 34/156 |
| 3,678,599 | 7/1972 | Vits | 34/156 |
| 3,763,571 | 10/1973 | Vits | 34/57 A |
| 3,873,013 | 3/1975 | Stibbe | 226/97 |
| 3,982,328 | 9/1976 | Gustafsson et al. | 34/156 |
| 4,218,001 | 8/1980 | Vits | 226/97 |
| 4,414,757 | 11/1983 | Whipple | 34/155 |
| 4,606,137 | 8/1986 | Whipple | 34/156 |
| 4,663,661 | 5/1987 | Weldy et al. | 358/44 |
| 4,785,986 | 11/1988 | Daane et al. | 226/97 |
| 4,881,181 | 11/1989 | Jeschke et al. | 364/519 |
| 4,922,628 | 5/1990 | Hella | 34/156 |
| 4,925,077 | 5/1990 | Daane et al. | 226/97 |
| 5,014,447 | 5/1991 | Hagen | 34/156 |
| 5,015,098 | 5/1991 | Berg et al. | 356/402 |
| 5,047,968 | 9/1991 | Carrington et al. | 364/574 |
| 5,105,562 | 4/1992 | Hella et al. | 34/156 |
| 5,111,515 | 5/1992 | Javidi | 382/43 |
| 5,134,788 | 8/1992 | Stibbe et al. | 34/44 |
| 5,149,401 | 9/1992 | Langevin et al. | 162/287 |
| 5,153,926 | 10/1992 | Jansson et al. | 382/54 |
| 5,182,721 | 1/1993 | Kipphan et al. | 364/526 |
| 5,184,555 | 2/1993 | Quadracci et al. | 101/417 |
| 5,208,874 | 5/1993 | Omura | 382/54 |
| 5,216,521 | 6/1993 | Birgmeir | 358/447 |
| 5,224,421 | 7/1993 | Doherty | 101/211 |
| 5,251,272 | 10/1993 | Hino et al. | 382/54 |
| 5,357,448 | 10/1994 | Stanford | 364/526 |
| 5,412,577 | 5/1995 | Sainio et al. | 364/469 |
| 5,526,285 | 6/1996 | Campo et al. | 364/526 |

FOREIGN PATENT DOCUMENTS

WO 91/08552  6/1991  WIPO.

OTHER PUBLICATIONS

Christie, S. et al.; "Image recognition using scatters light in coherent processor"; Periodical:Image processing and Its applications, IEEE conf. Pub. 354, pp. 361–364, 1992.

Primary Examiner—Emanuel T. Voeltz
Assistant Examiner—Kamini S. Shah
Attorney, Agent, or Firm—Michael, Best & Friedrich

[57] ABSTRACT

A method for monitoring color of a printed image printed on a substrate, the method comprising the steps of: positioning a camera assembly to receive light reflected from the printed image on the substrate, the camera assembly including a structure for producing a signal; transmitting the signal from the camera assembly to a computer; and processing the signal in the computer to correct for the effects of scattered light reflected from the printed image.

30 Claims, 11 Drawing Sheets

Microfiche Appendix Included
(3 Microfiche, 198 Pages)

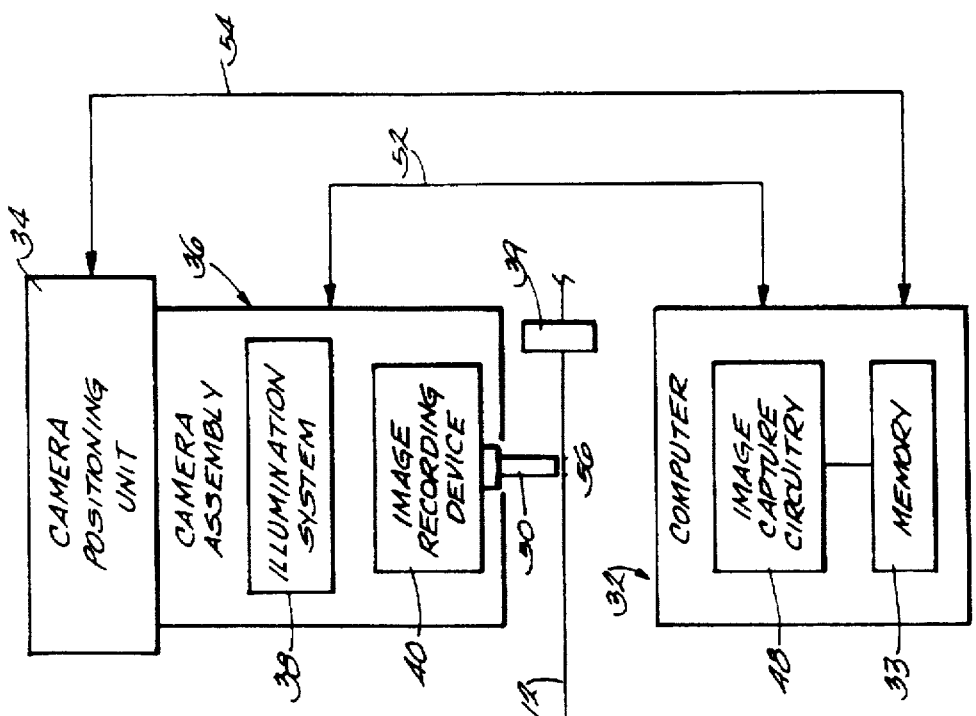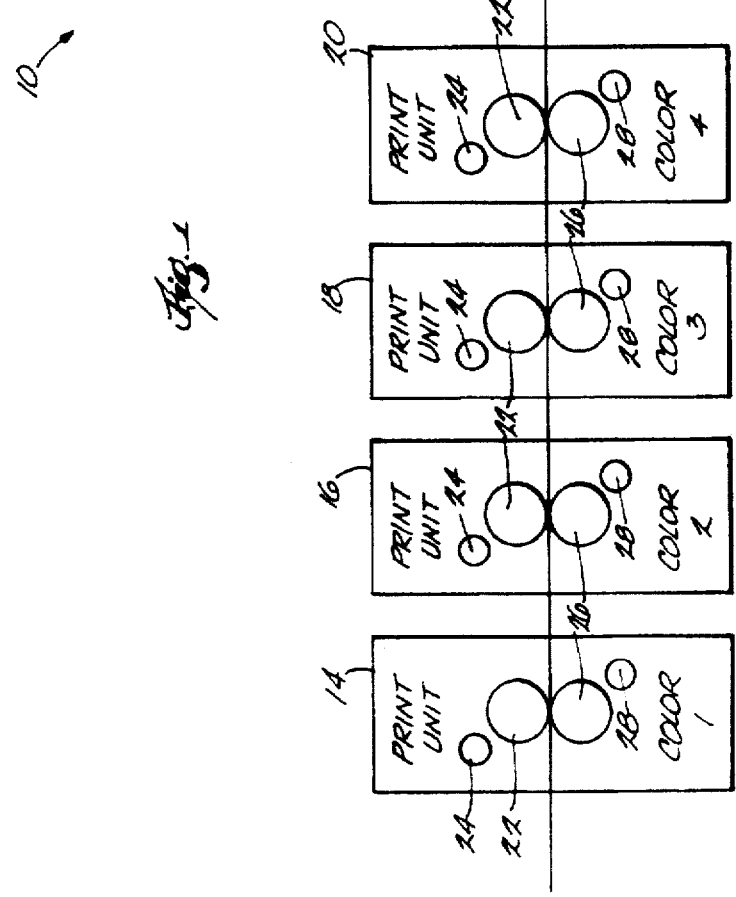
Fig. 1

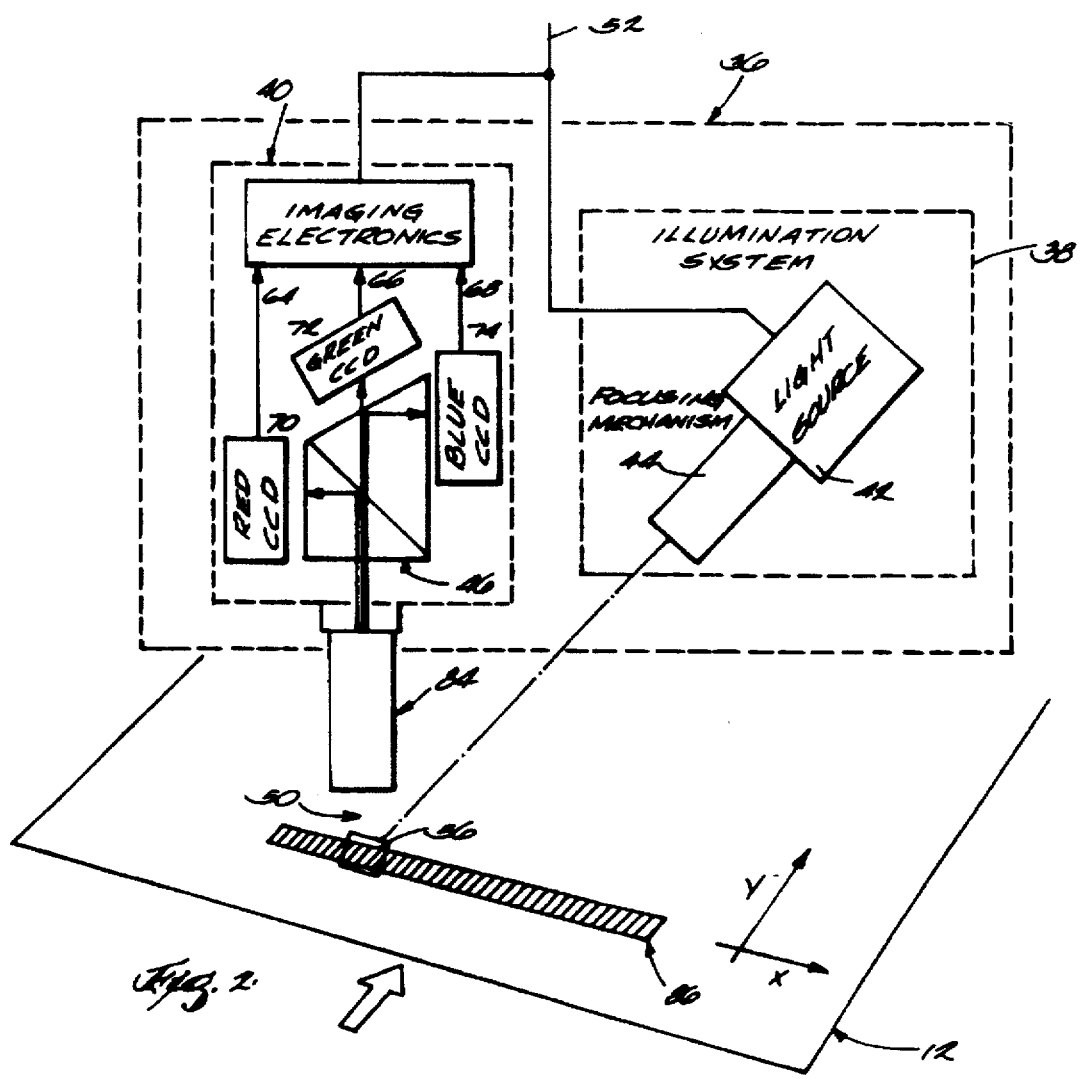

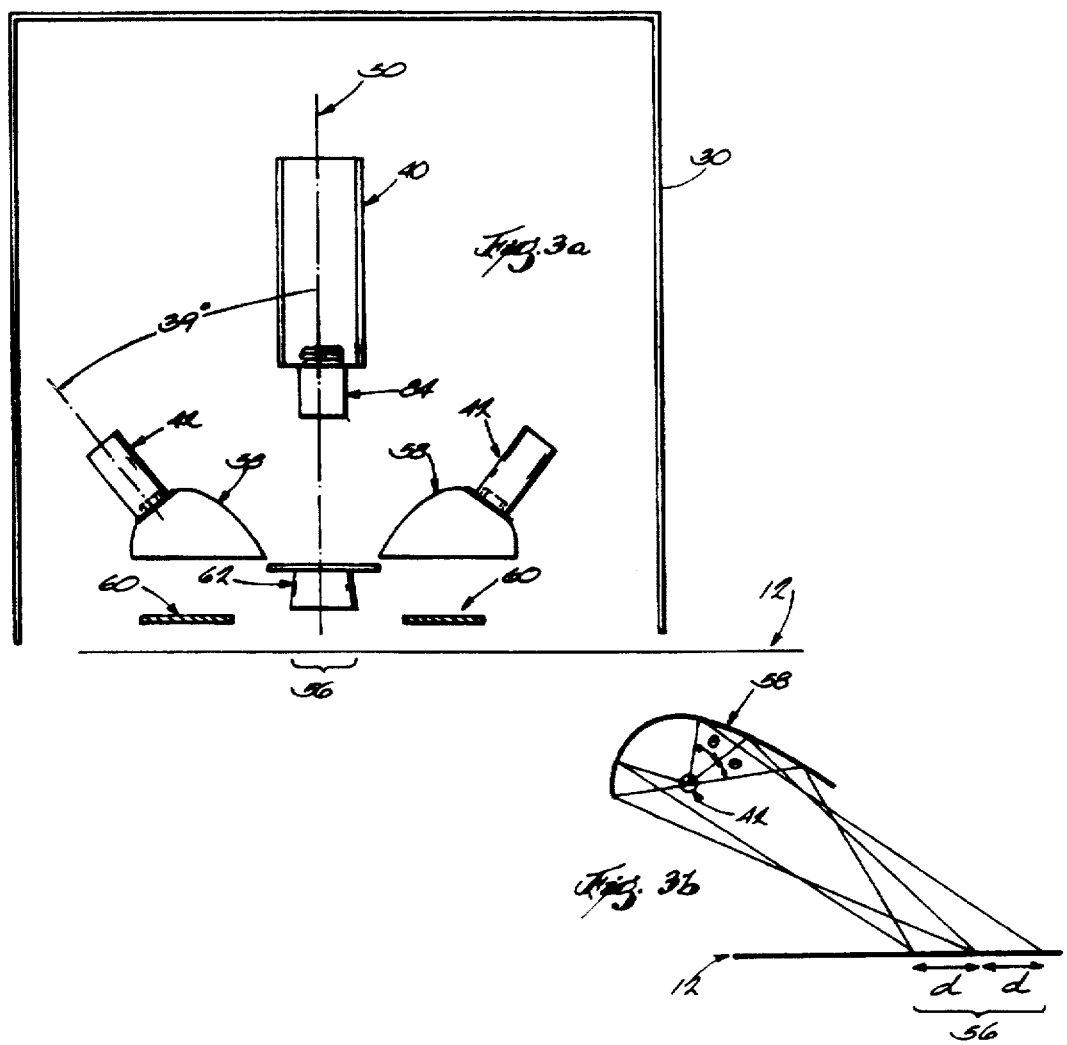

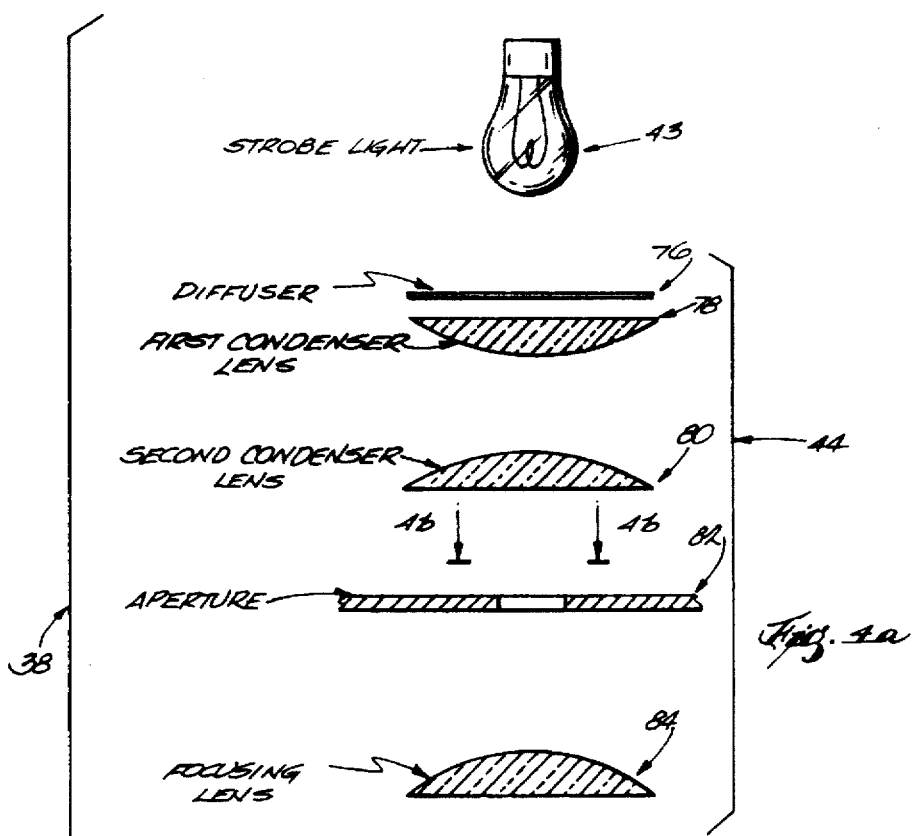
Fig. 4a
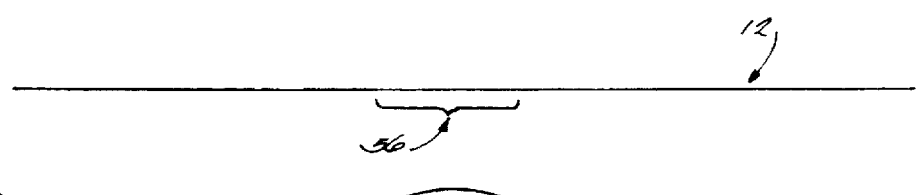
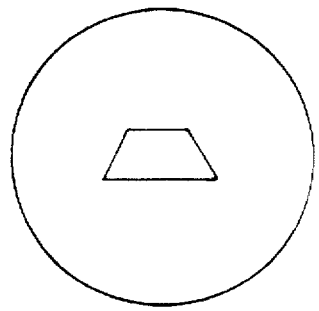
Fig. 4b

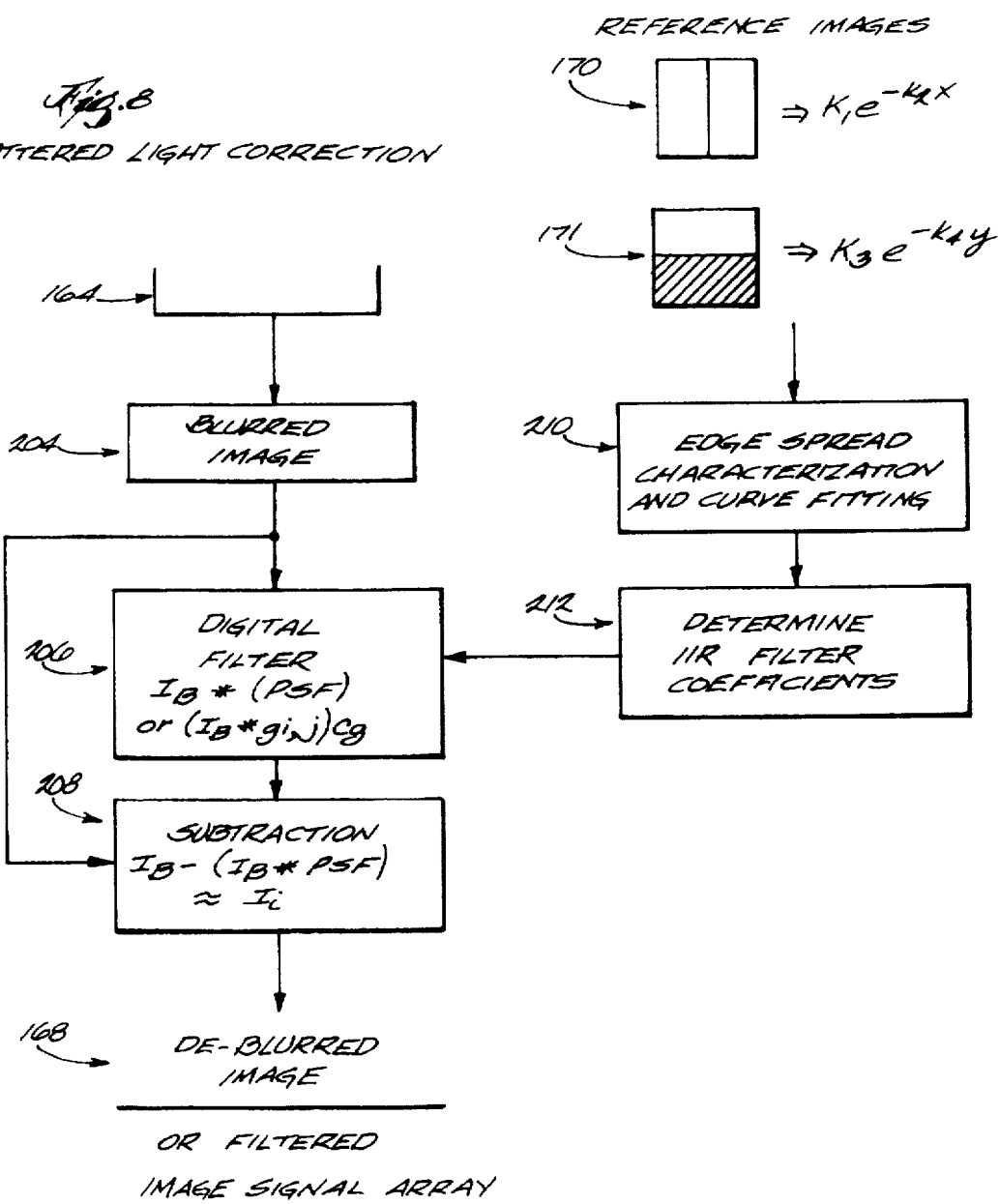

SYSTEM AND METHOD FOR MONITORING COLOR IN A PRINTING PRESS

The computer program referenced in the present application is included in a microfiche appendix labelled "System and Method for Monitoring Color in a Printing Press", with inventors: John C. Seymour, Jeffrey P. Rappette, Frank N. Vroman, Chia-Lin Chu, Bradly S. Moersfelder, Michael A. Gill, and Karl R. Voss. The microfiche appendix includes three sheets of microfiche and is on a total of 198 frames.

BACKGROUND OF THE INVENTION

The present invention relates generally to a system and method for monitoring color on a printing press. More particularly, the invention relates to a system for accurately monitoring color, based on measuring the reflectance and/or the optical density of color test strips printed on a web, and correcting for the effects of scattered light.

In the printing industry, quality control of color printing processes typically has been achieved by measuring the optical density of a test image using a densitometer or scanning densitometer off-line of the web printing process. Optical density measurements are performed by illuminating a test image with a light source and measuring the intensity of the light reflected from the image. Optical density (D) is defined as:

$$D = -\log_{10}(R)$$

where R is the reflectance, or ratio of reflected light intensity to incident light intensity.

In the printing industry, the test image which is measured is often in the form of color test strips or color bars. These are known in the art and are discussed in U.S. Pat. No. 3,393,618, entitled "Printing Control," and also in U.S. Pat. No. 4,469,025, entitled "Device for Mounting Print Control Strips at a Precise Level and in Registry." These color bars are comprised of individual color patches of varying ink color and tone having dimensions approximately 0.2 inches by 0.2 inches, with the color patches laid out in a row adjacent one another. They are often printed in the trim area of the web and may be utilized for registration as well as color monitoring purposes. As printers attempt to minimize paper costs through the use of "short-cutoff" presses (for example, the Harris-Heidelberg M-1000BE or M-3000 press), the trim area on the printed sheet becomes smaller, and accordingly, so do the color patches. The color patches presently may be as small as 0.10 inches by 0.0625 inches. One method for the optical density measurement of color test strips is disclosed in U.S. Pat. No. 4,881,181, issued to Jeschke et al.

A color video camera is ideal for measuring optical density on-line because many points can be measured at the same time and precise alignment of the camera with the test area is not necessary. However, optical density measurements of color test strips on-line are often inaccurate because of the degrading effects of glare and scattered light. This is especially true when the smaller color patches are to be measured. Scattered light within the camera raises the signal levels of the test strips being measured which corresponds to an increase in reflectance and a decrease in optical density. Proper color monitoring requires that black ink with an optical density of up to 2.0 (corresponding to a reflectance of 1%), be accurately measured. However, in a printing process where the background web is white, light scattered from the white areas of the image will affect the optical density measurement of the darker areas, resulting in lower measured optical densities, perhaps as low as 1.5.

Previous methods to correct for the effects of scattered light in optical systems such as copy machines have been described in a number of patents. In Birgmeir, U.S. Pat. No. 5,216,521, a method to correct for scattered light is described which involves subtracting a constant, derived from the average recorded image brightness, from the entire recorded image signal. This approach is a first step in correcting for the effects of scattered light, but further refinements in accuracy are possible.

In Jansson, U.S. Pat. No. 5,153,926 a method is disclosed to weight each pixel in an image scanner to correct for scattering to the other pixels. This method involves determining the weighting factors by empirical methods.

Omura, U.S. Pat. No. 5,208,874 describes a spatial deconvolution of a flare response function with a deteriorated image to obtain the original image. This is achieved by obtaining the flare response function from an experimentally measured line spread function, transforming the flare response function and the deteriorated image, through the use of Fourier transforms (FT), into the spatial frequency domain, then dividing the FT of the deteriorated image by the FT of the flare response function, and finally obtaining the original image by taking the inverse Fourier transform of the result. This method, even with fast Fourier transforms (FFTs), is computationally intensive and introduces edge effects.

Similarly, Hino, U.S. Pat. No. 5,251,272 describes a method and apparatus for processing an image signal and correcting for a secondary light source effect. This is based on experimentally obtaining the line spread function for an optical system, and obtaining the secondary light source effect function by differentiating and normalizing the experimental response.

Another method, geared towards minimizing the effects of scattered light, utilizes a "black mask" CCD imager. In this camera, all non-imaging areas of the CCD are black. For example, this technique is employed in the Hitachi DK-7700U color camera which is more expensive than a standard color video camera. This black mask minimizes the light reflected from the CCD surface, and hence reduces the total scattered light. However, it does not affect the light scattered within the lens.

Additionally, accurate optical density measurement requires consistent, even illumination over the imaging field of view, with minimal extraneous reflections or glare. Typical prior art designs concentrate light with a parabolic reflector, making inefficient use of the light and illuminating areas outside the field of view.

SUMMARY OF THE INVENTION

It is an object of the present invention to provide a system and method for accurate measurement of reflectance and/or optical density of color bars printed on a web or substrate. It is an additional object of the invention to efficiently and economically correct for the effects of scattered light on such optical density measurements, as well as correcting for other distortions.

The present invention provides a system for accurate optical density measurement of color patches printed in color bars on a web. The invention is a system comprised of a camera assembly and a computer. The camera assembly includes an illumination system for illuminating the web and an image recording device such as a video camera. The computer includes memory and image capture circuitry.

In operation, the camera positioning unit moves the camera assembly to a first position on the web. An image within the field of view of the camera is illuminated by a light source and the video camera records an image signal which is a likeness of the printed image. The light source is synchronized with the web such that the light source is activated when the printed image within the field of view includes a portion of the color bars. The recorded image signal is next digitized by the image capture circuitry and stored in the computer's memory as a captured image signal array. Various signal processing techniques are utilized to correct the captured image signal array for scattered light, uneven white response across the elements of the imager, black bias, and camera nonlinearities. Additionally, the captured image array is processed to locate the individual color patches. The optical density value for each color patch is then determined.

The present invention provides a novel scattering correction method. The present invention further provides an illumination system for optimal illumination of the field of view. The system includes a strobe and reflector system which improves the evenness of illumination across the field of view. As an alternative, the system includes a strobe and collimator with an aperture, which provides illumination only to the field of view.

The present invention further provides a method for locating the individual color patches. The system includes processing circuitry which finds the position of the color bars within the field of view by signal processing means.

BRIEF DESCRIPTION OF THE DRAWINGS

FIG. 1 is a block diagram of a printing system in accordance with the present invention;

FIG. 2 illustrates a camera assembly and a printed image within the field of view;

FIG. 3(a) illustrates a reflector, hood, and baffle arrangement;

FIG. 3(b) illustrates a Vromanoid reflector;

FIG. 3(c) is a plot of the Vromanoid equation;

FIG. 4(a) illustrates a condenser-lens arrangement;

FIG. 4(b) illustrates a cross section of the aperture;

FIG. 7(a) illustrates an exponential point spread function;

FIG. 8 is a flow chart of the scattered light correction;

DESCRIPTION OF THE PREFERRED EMBODIMENT

Figure 5A:
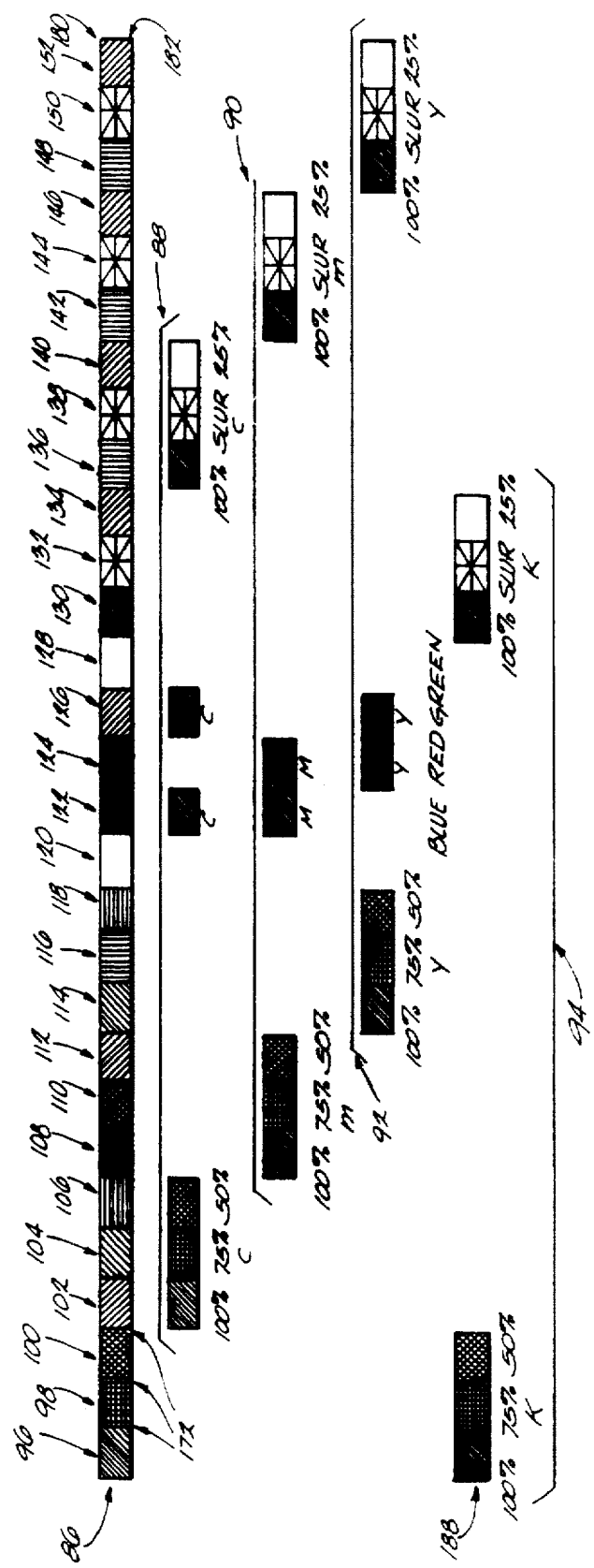
FIG. 5(a) illustrates a typical color bar.

Referring to FIG. 1, a printing system 10 for printing a multi-color image upon a web 12 is illustrated. In the preferred embodiment, four printing units 14, 16, 18, and 20 each print one color of the image upon the web 12. This type of printing is commonly referred to as web offset printing. Each print unit 14, 16, 18, 20 includes an upper blanket cylinder 22, an upper printing plate cylinder 24, a lower blanket cylinder 26, and a lower printing plate cylinder 28. In printing system 10, colors 1, 2, 3, and 4 on units 14, 16, 18, and 20 respectively, are black (K), cyan (C), magenta (M), and yellow (Y). The location of printing units 14, 16, 18, and 20 relative to each other is determined by the printer, and may vary.

In the preferred embodiment, the printing press is a web offset printer. It is contemplated, however, that the hereinafter described system also be applicable to other types of printing presses, such as rotogravure or flexographic.

System 10 also includes a camera assembly 36 in optical communication with the web 12. The camera assembly 36 includes an illumination system 38 and an image recording device 40. Additionally, printing system 10 includes a camera positioning unit 34, a computer 32, and a web stabilizer 39.

In general operation, the camera positioning unit 34 moves the camera assembly 36 to a first position on the web 12. A printed image is illuminated by the illumination system 38 and the image recording device 40 records an image signal which is representative of the printed image within the field of view 56. The illumination system 38 is synchronized with the movement of the web 12 such that the recorded image signal includes a portion of the color bars.

The computer 32 may be of the conventional type including a 486 or Pentium microprocessor and PC architecture. Computer 32 includes random access memory 33 (semiconductor memory and/or disk drive storage) and image capture circuitry 48 which interfaces with the camera assembly 36.

Computer 32 is connected to camera positioning unit 34 by data bus 54, and computer 32 sends control signals to the camera positioning unit 34. The camera positioning unit 34 is mechanically coupled to camera assembly 36 and moves the camera assembly 36 in a direction perpendicular to the web motion, termed the lateral direction (X-axis, see FIG. 2). The purpose of moving the camera assembly 36 across the web 12 is to allow selective image recording of lateral portions of the printed image on web 12. The camera assembly 36 records the printed image within the field of view 56 for various positions of the camera assembly 36 across the web 12. Web 12 is moving in the Y direction so that circumferential or Y-axis positioning by unit 34 is not necessary because the timing of the strobe light in the illumination system 38 effectively provides circumferential positioning relative to moving web 12, as further explained below.

It is also contemplated that a camera positioning unit not be utilized, if, for example, a plurality of cameras are combined to obtain a field of view that covers all required areas of the web 12.

Stabilization may be necessary to reduce the web motion toward and away from the camera assembly 36. This motion is termed web flutter. Web flutter will cause the image to sometimes be out of focus and will cause the magnification of the image to change. Stabilizer 39 can be any mechanism which dampens the flutter of web 12 to within acceptable limits of depth-of-field for recording the printed image on the web 12 by the camera assembly 36, without causing the ink to smear. Web stabilizer 39 is preferably a non-invasive web stabilizer such as that disclosed in U.S. Pat. No. 4,913,049 entitled "Bernoulli Effect Web Stabilizer." A non-invasive stabilizer is one which does not make physical contact with the web 12.

Stabilization may also be effected by partially wrapping the web 12 around a roller with large circumference compared to the size of the camera's field of view. One disadvantage of this is that a geometric distortion in the image due to the curvature of the roller may be introduced.

Alternatively, stabilization may be achieved by wrapping the web around two rollers and imaging between the rollers.

If the web 12 is transparent or translucent, accurate optical density measurements will require that light reflected back through the web 12 be minimized. This can be accomplished by providing a black backing behind the web 12, providing a large open cavity behind the web 12 such that little light will be reflected through the web 12, or utilizing a black roller if the web 12 is stabilized by imaging on a roller.

The camera assembly 36 and camera positioning unit 34 may be mounted on the press anywhere after the ink has been applied to the web 12. For example, in a heatset web offset press, the color measurement system may be mounted between the last print unit and the oven, directly after the oven, on the chill rolls, or after the chill rolls. If optical density measurements are required in the absence of other inks, or if the measurement is required immediately subsequent to printing, it may be advantageous to mount the color measurement system between print units.

In the preferred embodiment, as shown in FIG. 2, the camera assembly 36 includes an image recording device which is a CCD color camera having red (R) 64, green (G) 66, and blue (B) 68 channels. For example, a Sony XC003 3-chip CCD color video camera may be used as the image recording device 40. This camera uses a dichroic prism 46 to separate reflected light from the printed image on the web 12 into a red channel 64, a green channel 66, and a blue channel 68, each channel including a separate CCD imager, 70, 72, and 74 respectively. Each of the three channels of the video camera is coupled to the computer 32 via signal bus 52, and each channel is configured to produce a recorded image signal of the printed image within the field of view 56 on web 12.

Camera assembly 36 also includes an illumination system 38 which is coupled to computer 32 by signal bus 52. The illumination system 38 includes light source 42 (only one shown) and a focusing mechanism 44. Control signals from the computer 32, corresponding to when the color bar is within the field of view 56, are sent via signal bus 52 to indicate when the web 12 should be illuminated by the light source 42. In the preferred embodiment, pulsed xenon strobe lights with a pulse duration of approximately one microsecond are utilized. With a web speed of 3500 feet per minute and a field of view of roughly 2"×1.8 inches, a one microsecond illumination time is preferred to minimize the amount of movement of the printed image during the time the image recording device 40 is quantifying the amount of incoming light reflected from the web 12. By way of example, the light source 42 could include a strobe light assembly utilizing EG&G Strobes FX-199 with power supplies PS-350-1.

The illumination control signals from the computer 32 are produced, for example, by conventional means utilizing rotational position information generated from a sensor placed on one of the blanket cylinders (22 or 26), knowledge of the speed of the web 12, and knowledge of the distance between the image recording device 40 and the blanket cylinder (22 or 26).

The focusing mechanism 44 efficiently concentrates the light emitted from the light source 42 onto the image within the field of view 56. When the strobe light is flashed, the image recording device 40 records the image within the field of view 56, which contains portions of the color bars.

As shown in FIG. 3(a), in the preferred embodiment, the camera 40 is mounted perpendicularly to the web 12 and the field of view 56 preferably is illuminated with two light sources 42 each mounted at an angle of 39 degrees from the camera axis 50. Various specifications for densitometry (for example CIE or ANSI specifications) require the light source be mounted at 45 degrees ±8 degrees from the camera axis 50. A two bulb system utilizes reflectors 58 to increase the amount of light emitted from the light source 42 which impinges upon the printed image within the field of view 56.

To minimize the light outside the field of view 56, a baffle 60 is positioned below the light source 42 so the web 12 directly beneath the light source 42 is not illuminated. Additionally, a glare shield 62 is added above the field of view 56 to further reduce unwanted light from entering the system. This effect will occur particularly if the illumination covers an area much larger than the field of view 56.

In the preferred embodiment, the reflector 58 is a "circular Vromanoid" reflector which is located above the light source 42 and efficiently utilizes light from the light source 42 to provide even illumination across the field of view 56. The Vromanoid reflector is illustrated in FIG. 3(b), and it translates equal angles (Θ) of light emitted from the strobe into equal distances (d) on the web 12. This reflector provides even illumination to within 2% over a 2" by 1.8" field of view. The curve of one particular reflector wall which meets these criteria is determined by:

$$Y = 10^{[0.1454 + (0.0057x)]} - 10^{[-0.1319 - (1.0488x)]}$$

as illustrated in FIG. 3(c). This curve is rotated about the axis of the strobe to complete the three dimensional shape.

As an alternative embodiment, reflector 42 could be replaced by a condenser-lens arrangement, mounted at 45 degrees to the camera axis 50. Referring to FIG. 4(a), light source 42 illuminates ground glass diffuser 76 at a distance of 22 millimeters from strobe (mmfs). Diffuser 76 could be, for example, a ROLYN Optics of California part no. 55.3000. Light from diffuser 76 is concentrated by a first condenser lens 78, centered 36 mmfs, and a second condenser lens 80, centered 57 mmfs. These lenses could be, for example, an Edmund Scientific part no. 31563 and ROLYN part no. 10.0177 respectively. Light from the first and second condenser lenses is focused on aperture 82 at 90 mmfs, and imaged onto web 12 at 240 mmfs, with a focussing lens 84 at 125 mmfs. The focussing lens 84 could be, for example, a ROLYN part no. 10.0085.

Referring to FIG. 4(b), aperture 82 is shaped as a trapezoid, having end dimensions of 0.525 and 0.725 inches, with a distance between ends of 0.600 inches. The trapezoid is oriented such that the larger end of the trapezoid is nearest the web 12. The aperture allows even illumination of the field of view 56, while disallowing illumination outside the field of view.

The condenser lenses 78, 80 collimate the light from the light source 42. In the preferred embodiment, the strobe lights 43 would be placed circumferentially ahead and behind the camera 40, so that the web would first travel past one of the strobes, then past the camera, then past the second strobe. This arrangement reduces the deleterious effects of possible corrugations of the web 12, which are wrinkles which run parallel to the edge of the web 12.

It is contemplated that the strobe lights could be placed in the lateral direction from the camera if corrugations are not a problem and if this arrangement is more convenient.

It is further contemplated that illumination could be provided by a single strobe light, or by a plurality of strobe lights.

It is further contemplated that, for some applications with slower web speed and/or larger fields of view, it would not be necessary to use pulsed xenon strobe illumination. Suitable avoidance of blur may be accomplished with the electronic shutter of the camera, or with mechanical shuttering means. In this case, more cost effective lighting may be provided by halogen bulbs.

The variation in brightness from strobe flash to strobe flash may constitute a large source of error in the density calculation. It is contemplated that this variability be reduced by means of a feedback mechanism which disrupts the current to the strobe when a predetermined amount of light has been delivered. This feedback mechanism may consist of a photodetector, an integrator, and a means for disrupting the current to the strobe. Such mechanisms are well known and can be found on commercially available strobe lights for photographic equipment.

The camera assembly 36 preferably is mounted in a light-tight housing to minimize the effects of ambient light on the printed image. In general, ambient light will increase the measured reflectance, and will do so in an uncontrolled manner. One approach to shielding from ambient light is the housing 30 shown in FIG. 3(a). In this apparatus, the proximity of the housing to the web 12, and the size of the housing relative to the field of view 56 of the camera is sufficient to significantly reduce the effects of ambient light. Alternatively, the web 12, the camera assembly 36, and camera positioning unit 34 could be enclosed in a light tight housing with narrow slits for the web to enter and exit. In either case, the interior of the housing should be darkened to reduce light scattering within the housing. Using a black paint of optical density at least 1.4 to coat the interior of the housing has proved sufficient to reduce ambient light effects.

Referring back to FIG. 2, the preferred embodiment of the video camera used in camera assembly 36 includes three CCD imagers 70, 72, 74 each of which provides a resolution of 768 pixels by 494 pixels (X direction by Y direction). A typical CCD imager provides approximately a 4:5 picture aspect ratio such that the field of view of the image recording device will be 2" (x-axis) by 1.8" (y-axis). The image recording device 40 is preferably mounted perpendicularly to the web 12, providing a working distance to the web 12 of approximately six inches. The camera lens 84 in the preferred embodiment is a Sony VCL-16WM 16 mm lens. By way of modification, future developments or different application requirements may make different pixel resolutions, field of view size and working distance preferable.

The field of view described (2.0" by 1.8") does not make efficient use of the pixels of the detector in that very few of the lines of the image represent color bar information. The efficiency can be improved by use of an imager with an aspect ratio which more closely approximates the aspect ratio of the color bar 86, for example, 768 pixels wide by 256 pixels high. With such an imager, the same amount of information could be derived with less expenditure for computer memory and processing. Alternatively, the use of an anamorphic lens (a lens which has greater magnification in one direction than another) in place of lens 84, would improve pixel efficiency.

Alternatively, a single CCD video camera which has colored filters arranged over each pixel of the image may be used as the image recording device 40. Although this camera is less expensive than a three chip camera, its spatial resolution is not as satisfactory.

Additionally, it is contemplated that cameras having imaging devices other than CCDs may be used. For example, MOS imagers may be used, depending upon the requirements of a particular application.

Referring back to FIG. 1, image capture circuitry 48 includes image capture boards which are connected to the expansion bus of computer 32. By way of example, the image capture circuitry may be of the bus board type manufactured by Synoptics of England SPR4000SCIB with 32 MB RAM which includes an A/D converter, and "Shademaster" diagnostic display driver. The vector signal processing library from Kuck and Associates of Urbana, Ill., may be used to optimize processing speed.

Signal bus 52 transmits recorded image signals from camera assembly 36 to the computer 32, and camera control instructions from computer 32 to camera assembly 36. Image capture circuitry 48 is configured to produce a captured image signal array by converting the recorded image signals into an array of digital signals, of size 640× 480 elements.

Three arrays are generated corresponding to information from each of the three color channels 64, 66, and 68 in FIG. 2. Each captured image signal array element contains an 8-bit "gray value" which is representative of the amount of light reflected from the corresponding area of the printed image within the field of view 56 and onto the corresponding CCD imager. The camera and the image capture boards are calibrated for each channel such that the output of the image converter circuit for a white reference image will have a gray value between 240 and 250 decimal, while a black reference image, with the lens cover on, will have a gray value between 0 and 10 decimal. The captured image signal arrays 160, 186 are stored in memory 33 of computer 32.

A representative embodiment of a color bar 86 is shown in FIG. 5(a). The color patches are arranged side by side in a color bar across the web 12. Typically, this series of color patches is repeated across the web 12. Color bar 86 is comprised of cyan 88, magneta 90, yellow 92, and black 94 components. By way of illustration, color bar 86 may include the following color patches: black 100% 96, black 75% 98, black 50% 100, cyan 100% 102, cyan 75% 104, cyan 50% 106, magenta 100% 108, magenta 75% 110, magenta 50% 112, yellow 100% 114, yellow 75% 116, yellow 50% 118, white 120, blue 122, red 124, green 126, white 128, black 100% 130, black slur 132, black 25% 134, cyan 100% 136, cyan slur 138, cyan 25% 140, magenta 100% 142, magenta slur 144, magenta 25% 146, yellow 100% 148, yellow slur 150, yellow 25% 152; where 100% represents full tone of the ink, 50% represents half tone, etc.

Figure 5B:
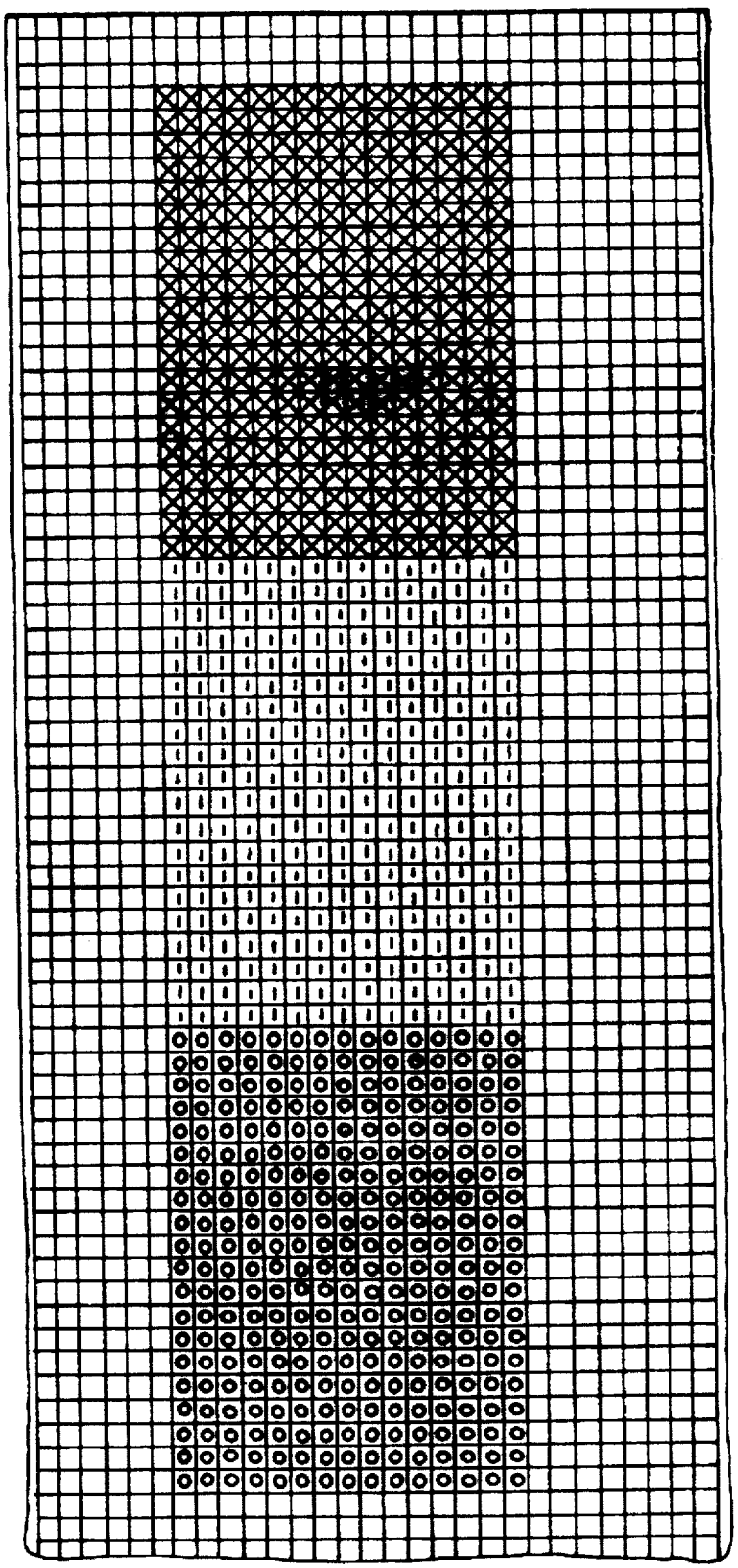
FIG. 5(b) illustrates the captured image signal array.

By way of example, the field of view 56 may be aligned with the axis of the color bar such that the data representing the color bar in the captured image signal array is located in adjacent rows of the captured image signal array, as illustrated in FIG. 5(b). In this orientation, lateral direction on the web is aligned with the X direction of the camera and circumferential direction on the web is aligned with the Y direction of the camera. As illustrated, the field of view 56 may contain only a portion of the color bar.

Figure 6:
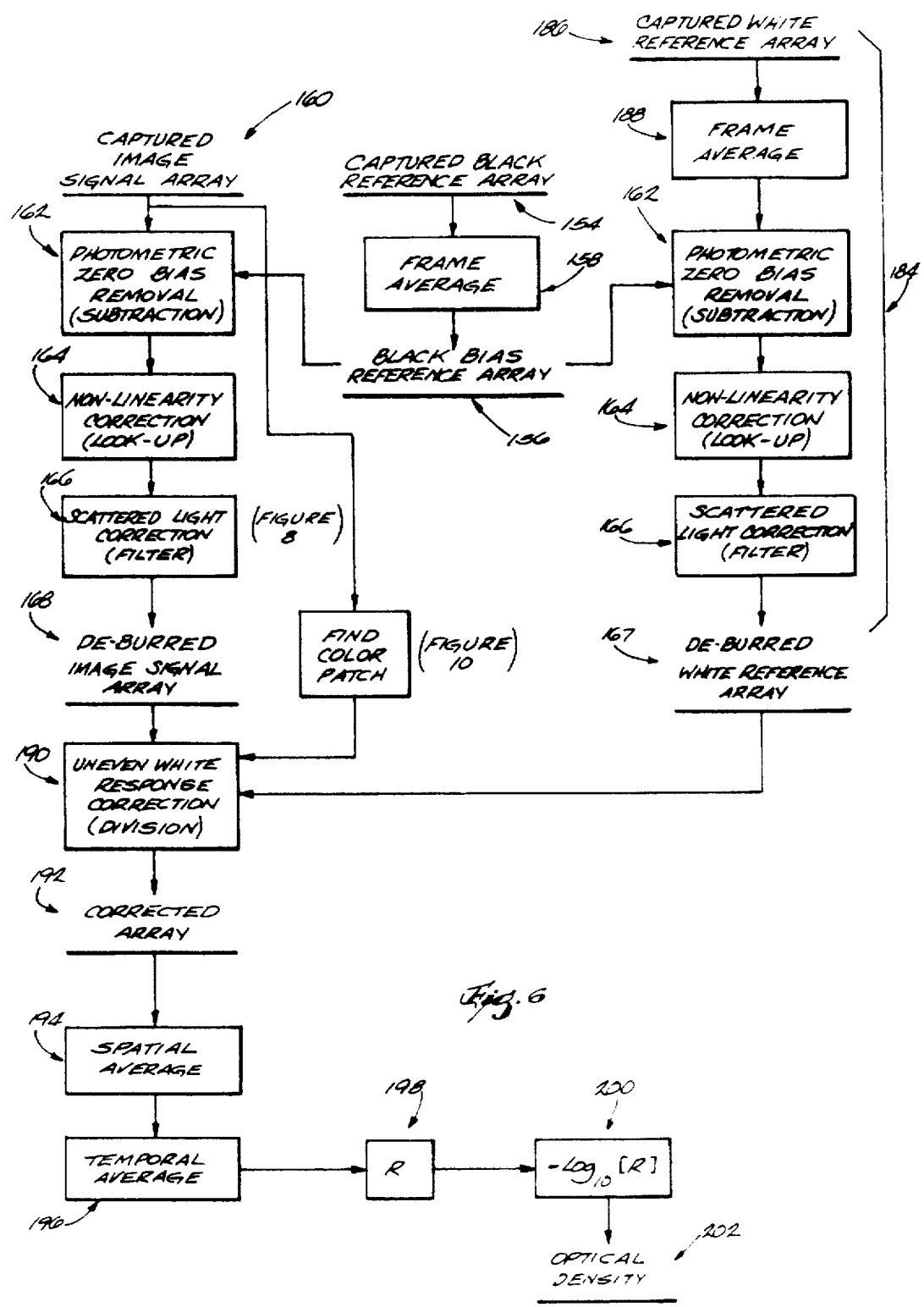
FIG. 6 is a flow chart of corrections and computations performed on the captured image signal array to obtain optical density of a color patch.

Computer 32 operates as a processing circuit, as shown in FIG. 6, to manipulate the captured image signal array for each color channel to correct for photometric zero, system nonlinearities, scattered light, and uneven white response. Also, computer 32 operates as an optical density conversion circuit by locating color patch boundaries within the captured image signal array and calculating the optical density of each individual color patch within the field of view.

To accomplish the photometric zero bias removal, black bias reference data 156 must be subtracted from the captured image signal data 160. A black bias reference array 156 is obtained by generating a captured image array 154 from a black reference image for each of the three color channels. The black reference image is obtained by imaging with the camera lens cover on, or alternatively, by imaging a black image having optical density above 2.0, without a light source.

Photometric zero bias removal is performed by subtracting the green channel of the black bias reference array from the captured image signal array for the green channel, repeating the process 162 for the red and blue channels. In the preferred embodiment, this correction is performed for each element in the array, although it is also contemplated that the black bias reference array 156 be decimated over a plurality of elements such that less memory is required to store the black bias reference array 156. Also, it is contemplated that the black bias reference array be generated by averaging several frames over time 158.

Nonlinearities are introduced into the captured image signal data from a number of sources, including distortion from the imaging electronics and the A/D conversion. To accomplish the nonlinearity correction, the computer 32 is programmed to operate as a nonlinearity correction circuit. This is accomplished by measuring the response of the system to an image having a known gray value. For example, a test strip 188 having a known gray value is imaged by the system, and the resulting captured image signal array is analyzed such that the measured gray value is related to the actual gray value. A nonlinearity correction circuit 164 may be embodied as a look up table, where the captured image signal data is corrected corresponding to the experimentally determined transfer function of actual gray value versus measured gray value.

To accomplish the scattered light correction, the computer 32 is programmed to operate as a scattered light correction circuit 166. Again, correction of data from each of the three color channels is performed separately.

By way of background, the response of an optical system to an input that is an ideal point source of light at (x1,y1) is called the point spread function (PSF), or alternately, the blurring function, $h(x,y;x1,y1)$. Once the PSF is known, the output response, $g(x,y)$ to an input of form $f(x,y)$ can be determined by the following equation: as set forth in *Image Science*, Dainty and Shaw, (1974)

$$g(x,y) = \int \int_{-\infty}^{\infty} f(x_1,y_1) h(x,y;x_1,y_1) dx_1 dy_1$$

Academic Press, p. 204–215.

Essentially, a two dimensional convolution between the input function $f(x,y)$ and the PSF yields the output response $g(x,y)$. In this case, the data in the captured image signal array 160 after the photometric zero 162 and nonlinearity corrections 164 corresponds to $g(x,y)$, or a blurred image 204. The PSF for optical systems, according to one model, is a rotated, modified Bessel function, $K_0$.

In prior art approaches for "undoing" a blurred image, deconvolution is used. A deconvolution process will ascertain $f(x,y)$ (an estimate of the image without the scattered light), from a known output response $g(x,y)$ (the blurred image), and known PSF $h(x,y)$. The prior art methods of computing the deconvolution of two functions involve Fourier transforms. Essentially, this amounts to Fourier transforming both the blurred image and the point spread function into the spatial frequency domain, dividing the transform of the blurred image by the transform of the PSF, and taking the inverse Fourier transform of the quotient to obtain the image without the scattered light. However, these prior art approaches are computationally intensive.

In the present invention, to minimize these computations, certain simplifying assumptions are made. First, the PSF is approximated by an exponential equation, which is two-sided in the x and y directions as well as separable in x and y variables. This PSF is shown in FIG. 7(a), and its equation is of the form:

$$PSF = Ce^{(-a|x|-b|y|)} = Ce^{-a|x|} e^{-b|y|}$$

The advantage of a separable function in x and y variables is that if a convolution is separable into an x kernel and a y kernel, then its two dimensional convolution with a function $g(x,y)$ can be performed by first convolving the x kernel with $g(x,y)$ and then convolving the y kernel with that result. This results in a significant reduction in computational requirements.

The edge spread response to a white to black stepped image in the x direction 170 is obtained by integrating the PSF defined above over x and y:

$$\int_{-\infty}^{\infty} \int_{x_0}^{\infty} ce^{-a|x|-b|y|} dx dy = \frac{2c}{ab} e^{-ax_0}$$

This shows that the response to an edge in the x direction is an exponential. Similar calculations show that the edge response is also an exponential in the y direction 171.

As a second assumption, the unblurred image 168 is approximated by the blurred image 204 minus the convolution of the blurred image with the approximated PSF 208.

Next, an efficient method to calculate the convolution of the two functions is to implement the approximated PSP by an exponential infinite impulse response (IIR) filter 206, and apply the IIR filter to the blurred image array 204. A flow chart of this process is illustrated in FIG. 8.

Figure 7B:
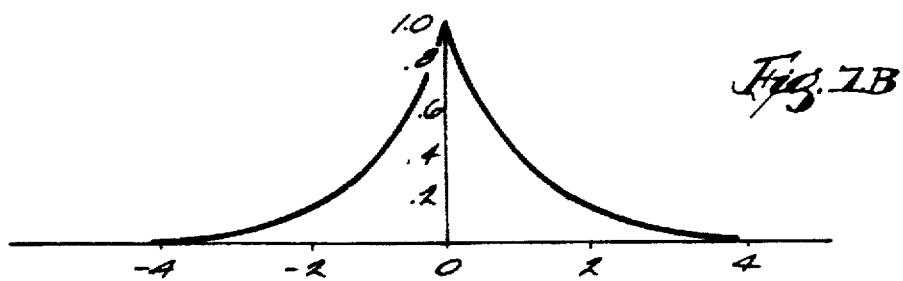
FIG. 7(b) illustrates a two-sided exponential.
Figure 7C:
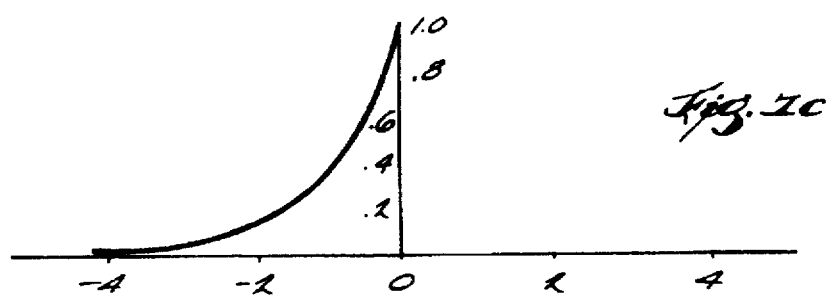
FIG. 7(c) illustrates a left-sided exponential.
Figure 7D:
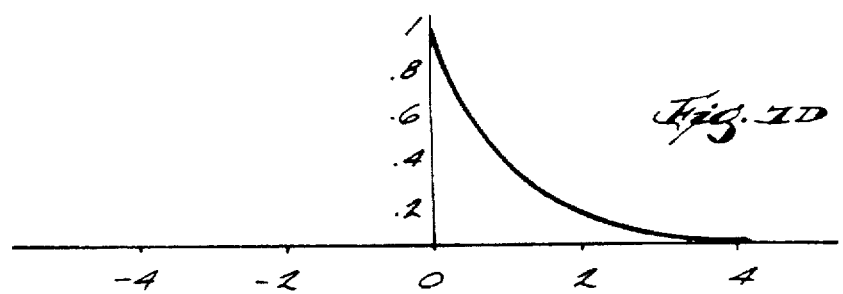
FIG. 7(d) illustrates a right-sided exponential.

A one-sided exponential (or $\exp(-ax)$ for $x>0$) can be realized with a simple IIR filter. FIG. 7(b) illustrates a two-sided exponential, which can be divided into a left-sided exponential and a right-sided exponential, as shown in FIG. 7(c) and (d) respectively. An interesting property of the two-sided exponential in one variable is that its convolution with an array may be implemented by convolving each row of the array with the left sided exponential and then convolving this result with the right sided exponential. Alternatively, to obtain the same result (except for a scaling factor) the array rows are first convolved with the left sided exponential, the array rows are next convolved with the right sided exponential, and the results of the two convolutions are added. In either case, the order in which the convolutions are performed is immaterial.

The equation for the left sided exponential in FIG. 7(c) is:

$$f_l(t) = ce^{at}, \quad t \leq 0$$
$$0, \quad t > 0$$

The equation for the right sided exponential is:

$$f_r(t) = ce^{at}, \quad t \geq 0$$
$$0, \quad t < 0$$

-continued $$f_l * f_r = \int_{-\infty}^{0} (ce^{ax})(ce^{-a(t-x)})dx, \ t \geq 0$$

$$\int_{-\infty}^{t} (ce^{ax})(ce^{-a(t-x)})dx, \ t < 0$$

$$= \frac{c^2}{2a} e^{-a|t|}$$

A one-sided exponential can be realized with a simple IIR filter:

If $f_i$ is the input data,
$\hat{f}_i$ is the filtered output data $$\hat{f}_i = kf_i + (1-k)\hat{f}_{i-1}, \text{ with } \hat{f}_o = f_o$$

Note that, if $$f_i = \begin{matrix} 1 & i=0 \\ 0 & i \neq 0 \end{matrix} \quad (f_i \text{ is an impluse})$$

then $\hat{f}_i = \begin{matrix} 0 & i < 0 \\ k(1-k)^i & i \geq 0 \end{matrix}$ because $k(1-k)^i = ke^{i\ln(1-k)}$ so the response to an impulse is an exponential. This filter is stable because the sum of its coefficients are less than or equal to one. Additionally, the filtered output can be processed in place, without the need for additional memory.

Therefore, a filter having the form:

$$f_i = k_x f_i + (1-k_x)\hat{f}_{i-1}, \text{ with } \hat{f}_o = f_o$$

when applied to the rows of the captured image signal array would essentially be equivalent to convolving a one-sided exponential with the array. (The result, however, will be off by a scaling factor).

A two-sided exponential can be implemented by performing the first pass as defined above on each row of the array, with a second pass defined as:

$$\hat{f}_i = k_l \hat{f}_i + (1-k_l)\hat{f}_{i+1}, \text{ with } \hat{f}_{n-1} = \hat{f}_{n-1}$$

The second pass is identical to the first pass, except that the direction of application of the filter is reversed. That is, if the filtered outputs from the first pass are determined by stepping the filter across the array rows from left to right (forward), the second pass of the filter is implemented by stepping the filter from right to left (reverse) across each row of the array. The coefficients for the right-going and left-going passes of the filters, $k_r$ and $k_l$, respectively, are determined by relating experimental measurements with the filter equations, as further explained below.

An implementation of a two-sided exponential filter would have the following impulse response:

$$\hat{f} = \left( \frac{k_r k_l}{k_r + k_l - k_r k_l} \right)(1 - k_l)^{-i} \quad i \leq 0$$

$$\left( \frac{k_r k_l}{k_r + k_l - k_r k_l} \right)(1 - k_r)^{-i} \quad i > 0$$

Because this formula is symmetric in $k_l$ and $k_r$, the order of the first pass and second pass is immaterial.

The separable two-sided exponential filter (see FIG. 7(a)), is implemented by first performing a two-sided exponential filter on each row of the array, and then performing a two-sided exponential filter on the columns of the array resulting after the first step. Again, the order of the steps is immaterial, but the inputs of each new pass are determined by the outputs from the previous filter pass. Thus, for each pass: forward, reverse, up, and down, the filtered outputs build on previous outputs.

An implementation of a separable two-sided exponential filter would have the following impulse response:

$$g_{i,j} = \begin{matrix} \gamma(1-k_l)^{-i}(1-k_u)^{-j}, i, j \leq 0 \\ \gamma(1-k_l)^{-i}(1-k_d)^{j}, i \leq 0, j \geq 0 \\ \gamma(1-k_r)^{i}(1-k_u)^{-j}, i \geq 0, j \leq 0 \\ \gamma(1-k_r)^{i}(1-k_d)^{j}, i, j \geq 0 \end{matrix}$$

where $\gamma = \left( \frac{k_l k_r}{k_l + k_r - k_l k_r} \right) \left( \frac{k_u k_d}{k_u + k_d - k_u k_d} \right)$, and $k_r$, $k_l$, $k_u$, and $k_d$ are the filter constants for the right-going, left-going, up-going and down-going filter passes, respectively. If $k_m = k_r = k_h$, and $k_u = k_d = k_v$, the impulse response simplifies to:

$$g_{i,j} = \frac{k_h k_v}{(2-k_h)(2-k_v)} (1-k_h)^{|i|}(1-k_v)^{|j|} =$$

$$\frac{k_h k_v}{(2-k_h)(2-k_v)} e^{\ln(1-k_h)|i| + \ln(1-k_v)|j|}$$

Therefore, a separable two-sided exponential filter can be implemented with the above described procedure. Because each of the four filter passes requires 3 operations (additions or multiplication), the resulting array (Ib convolved with PSF) can be computed with 12 operations per element. It is contemplated that multiple passes of this filter may be performed (with possibly different filter coefficients) to improve the approximation of the filter to the actual PSF.

Figure 9A:
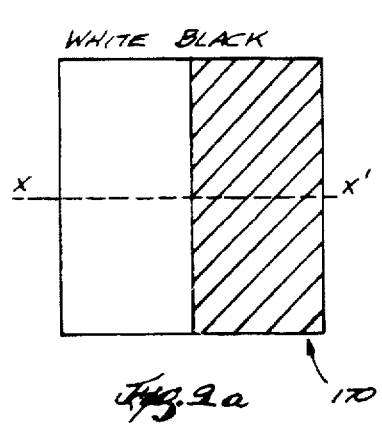
FIG. 9(a) illustrates a stepped white to black test image.
Figure 9B:
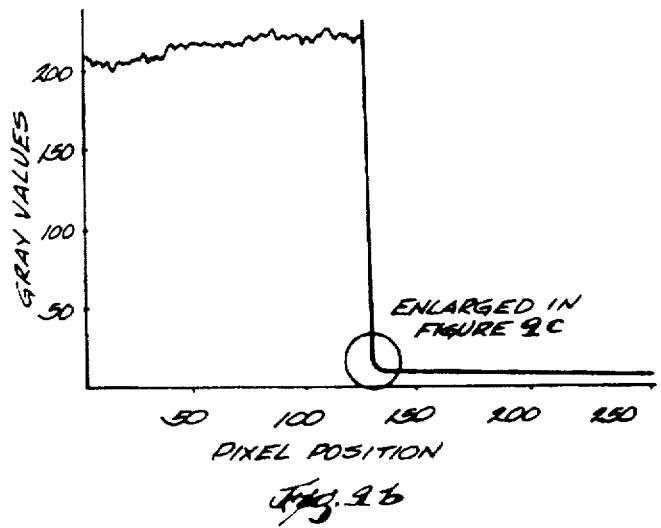
FIG. 9(b) is a profile of gray values across line x-x' of the stepped white to black test image.
Figure 9C:
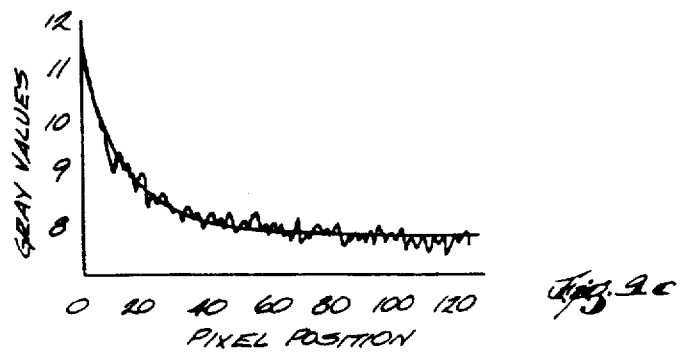
FIG. 9(c) illustrates an enlarged view of the circled area in 9(b)

The filter coefficients $k_h$ and $k_v$ must be determined. These coefficients are computed by relating experimental data from an edge spread response to the filter coefficients. Specifically, an edge spread response of each color channel is determined 210 by plotting the measured gray values of a stepped white to black test image 190 as a function of position across the image. This is illustrated as line x-x' in FIG. 9(a), with the gray value response plotted in FIG. 9(b), as a function of element position. Additionally, the circled area is also enlarged in FIG. 9(c), with x=0 redefined as the edge of the white to black step in FIG. 9(c). A curve of form $$K_1 e^{-k_2 x}$$

is determined to best fit the experimentally measured data points. This process is repeated to obtain curve:

$$K_3 e^{-k_4 y}$$

by measuring the experimental response of a half white, half black image oriented in the vertical direction as well, as illustrated by the reference image 171 in FIG. 8.

In the preferred embodiment, a curve fitting is performed for each of the three color channels for the horizontal and vertical directions.

Note that the edge response to a PSF of form:

$$PSF = Ce^{(-a|x|-b|y|)} = Ce^{-a|x|}e^{-b|y|}$$

as previously calculated is:

$$\frac{2c}{ab} e^{-ax} \text{ and } \frac{2c}{ab} e^{-by}$$

The experimental curve fitted results are set equal to the calculated equations to obtain $K_2=a$, $K_4=b$. C can be solved for as a function of $K_1$ and $K_3$ (solving two equations for one variable will necessitate some additional approximations, for example taking the average of the two results). Finally, the equation constants a, b, and c, are related to the filter constants. Because the formula for a two dimensional IIR filter was determined to be:

$$g_{i,j} = \frac{k_h k_v}{(2-k_h)(2-k_v)} (1-k_h)^{|i|}(1-k_v)^{|j|} =$$

$$\frac{k_h k_v}{(2-k_h)(2-k_v)} e^{\ln(1-k_h)|i|+\ln(1-k_v)|j|}$$

it follows that:

$\ln(1-k_h)=-a$ and $\ln(1-k_v)=-b$ and therefore $k_h$ and $k_v$ may be obtained.

The last operation that must be performed is to scale the convolution result (IB*g(i,j)) down to match the scaling of the blurred data. One approach to computing this scaling constant would be to find the scaling necessary, call it $c_g$, that would make the values of the filters at the origin match. Equating the value of the PSF at (0, 0) with the value of g(i,j) at (0,0):

$$c = \frac{k_v k_h}{(2-k_h)(2-k_v)} c_g$$

Solving for $c_g$ provides the appropriate scaling factor.

Each element of the captured image signal array represents color information for the image within the field of view of the camera assembly. However, because the size of an individual color patch is small compared to the field of view, in order to extract the color information associated with each individual color patch, it is necessary to locate each color patch within the array. In the preferred embodiment, the size of the captured image signal array is 640 by 480 elements, while the size of the color patch corresponds to approximately 20×15 elements.

As set forth above, the field of view 56 of the camera assembly 40 is aligned with the axis of the color bar 86 such that the data representing the color bar in the captured image signal array 160 is located in adjacent rows of the captured image signal array 160. The captured image signal array 160 contains a portion of the color bar 86, which extends laterally across the web 12. The exact positioning of the color bar 86 within the field of view 56, however, is not known, because of web weave (movement of the web along the X-axis), circumferential (Y-axis) motion of web, and misalignment between colors. Thus, the rows of the captured image signal array 160 in which the color bar data may be found, are not known. Similarly, the columns of the captured array in which the individual color patches (96–152) may be found are not known. Therefore, the computer 32 is programmed to operate as a color patch location circuit, which provides information regarding color patch boundaries 172 in the captured image signal array.

Figure 10:
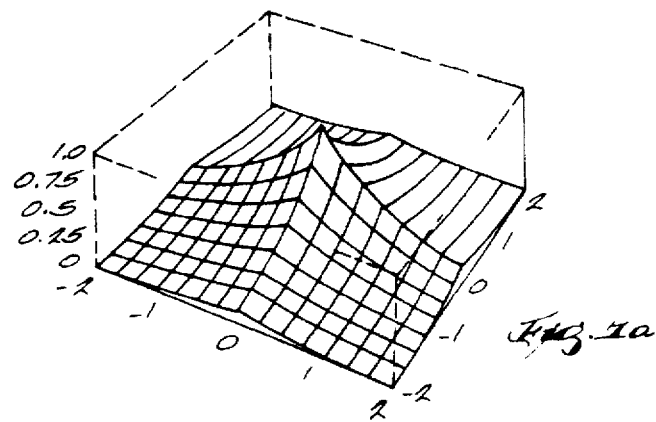
FIG. 10 is a flow chart of the color patch signal processing.
Figure 10:
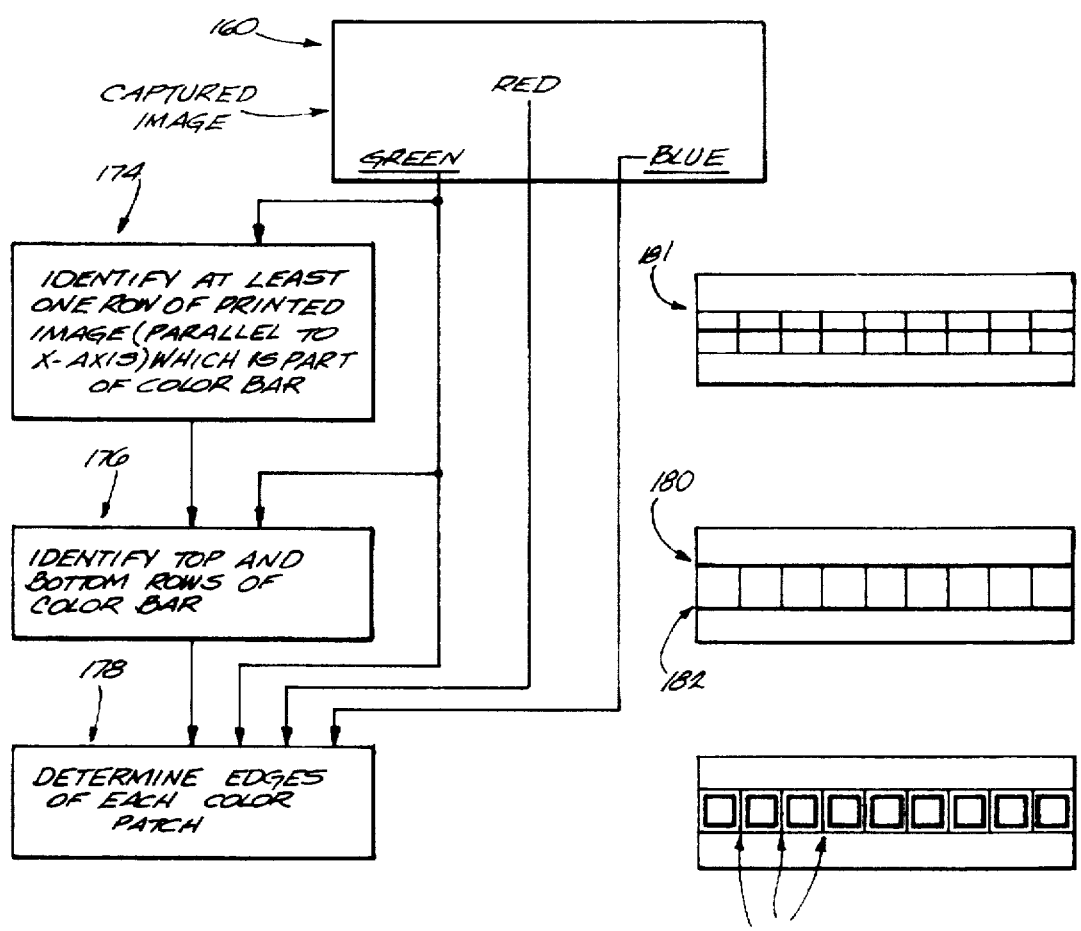

Referring to FIG. 10, the color bar determination circuit has three major steps:

1. (174) identification of rows 181 in the array 160 which correspond to the color bar 86,
2. (176) identification of the top 180 and bottom 182 rows of the color bar 86, and
3. (178) identification of each color patch edge 172.

Identification of rows in the array which are part of the color bar 86 may be performed by calculating a correlation coefficient of a row in the captured image signal array 160 with a known color bar template row. Because the lateral position of the color bar within the captured image signal array is unknown, correlation of the image array data against color bar template data must be performed with varying offsets (Δ) between the color bar template row and a row from the image signal array. Note that for these computations, information from the green channel of the image signal array is utilized. It is contemplated that any channel or combination of channels which is sufficiently representative of the color bar pattern may be used.

The correlation coefficient is defined as:

$$r = \frac{\sum_{i=1}^{n}(x_{i+\Delta}-\bar{x})(y_i-\bar{y})}{n\sigma_{x,\Delta}\sigma_y}$$

r is normalized so that $-1<r<1$, where $r=1$ means perfect correlation between x and y. A correlation coefficient of >0.55 indicates a relatively good match between a row of the image array and the color bar template row.

Note that because of the physical size of the color bar 86 within the field of view 56, the color bar information is contained in more than one row of the array 160, so that it is not necessary to calculate the correlation coefficients for every row of the array. Once the number of rows in the array containing color bar information is known (which in the present embodiment is approximately 15 rows), it is possible to calculate the number of rows that may be skipped. Thus, calculations need be performed for sampled rows only instead of every row. For example, to insure at least two rows of the array will have a correlation coefficient of >0.55, for a color bar with a height corresponding to 15 rows in the array, six rows can be skipped between correlation calculations of the sampled row with the color bar template row.

Additionally, FFTs are an efficient method for calculating the correlation coefficient for each possible offset between the positioning of the color bar template row and the captured image signal row. By way of background, cross correlation of the functions x and y is defined by:

$$\text{Cross Correlation} = \sum_{i=1}^{n} x_{i+\Delta}y_i$$

The correlation theorem relates cross correlation and Fourier transforms:

z=x★y corresponds to Z=X Y*

(where ★ means cross correlation, * denotes complex conjugate, and Z=FT(z), X=FT(x), Y=FT(y))

Cross correlation in the spatial domain is conjugate multiplication in the Fourier domain. In other words, cross correlation can be performed by computing the Fourier transforms of the color bar template row and of a row of the image signal array, computing the complex conjugate of the second, computing the point by point product in frequency space, and inverse Fourier transforming.

To use Fourier transforms to calculate a correlation coefficient r, FFTs for both the color bar template row and a row of the image signal array are computed. FFTs are best performed on a row having n elements, where n is a power of two (256, 512, 1024, etc.). Because the size of the template color bar row is 1024 elements, the image signal row must be extended to 1024 elements also. The elements in the extension are filled by the average value of the other 640 elements in that row.

Next, the template FFT is multiplied by the complex conjugate of the image FFT. Setting the DC offset in frequency space equal to zero for either FFT(x) or FFT*(y) and then inverse Fourier transforming the product back to the spatial domain is equivalent to computing the numerator in the correlation coefficient equation.

To compute the correlation coefficient r, the resultant array must be divided by the denominator of the correlation coefficient equation to produce the r-info array. Note that the standard deviation of x in the denominator is dependent on the offset, and must be recalculated for each different offset.

The r-info array is the result of the cross correlation and division, and will be a row of size 1024. As set forth above, this 1024 r-info array is calculated for sampled rows of the image signal array. In each r-info array generated, the position of the largest value of r within the array corresponds to the offset which provides the best match between the color template row and the selected image signal row. Thus, for each sampled row, a maximum correlation coefficient, r, and an offset, $\Delta$, corresponding to that correlation coefficient are determined.

Next, of these sampled rows, one row is selected which is within the color bar, and not on an edge of the color bar. This last step is performed by calculating a score for each sampled row. The score is determined by the following equation:

$$\text{Score} = \frac{r_a + r_b}{2} (1 - .05|\Delta_a - \Delta_b|)$$

where $r_a$ and $\Delta_a$ represent the correlation coefficient and offset for a particular row and $r_b$ and $\Delta_b$ represent the correlation coefficient for the subsequent row. The selected row is determined by the highest score.

Several verifications follow to insure the selected row is actually part of the color bar. First, the maximum r in the r-info array for that row must be greater than 0.55. A further verification step is to divide the selected line into five 128 element pieces, which are correlated against 128 element portions of the color bar template row. Each of the r values computed here should be larger than 0.55.

Once the selected row is determined, values of all elements within that row of the captured image signal array are averaged to determine an average gray value. This is also done for rows adjacent the selected row within the captured image array. Determining the top and bottom rows of the color bar may be achieved by taking a derivative with respect to row position of the average gray value versus row position for rows above and below the selected row. A large (plus or minus) derivative indicates a top or bottom. This method is successful because all rows within the color bar should have average gray values within a small range.

While this is a very fast computation, conditions may arise where this technique defines the boundaries incorrectly. It is contemplated that a more robust technique for determining top and bottom rows may involve computation of the correlation coefficient between the selected row and adjacent rows.

Finally, it is necessary to determine the position of color patches within the color bar. For this portion of the process, information from all three color channels must be utilized. The average gray value for the relevant rows of each column of the captured image signal array is determined. The relevant rows are rows which have already been determined to be color bar rows, as set forth above.

A running average of gray values will be performed on these column averaged values to reduce noise. The result is a red, a green and a blue array of average values along the horizontal lines through the color bar.

The patch edges may not be clearly defined in all channels. Also, there may not be a single channel where all the edges are clearly defined. In particular, an edge between a solid yellow patch and a 75% yellow patch will probably only be apparent in the blue channel, whereas the same transition for cyan would be nearly invisible in the blue channel. It is thus necessary to decide for each edge which channel will provide the best information regarding that edge.

To decide this, differentiations are performed on the running averaged arrays. Peaks in these differentiated arrays will correspond to the edges between the color patches, and the relative amplitude of the peaks will correspond to the relative faith that that particular channel can be used to locate that particular edge.

From the offset determined from the correlations in the first part of this algorithm, and from a description of the color bar, the rough location of each of the color patch edges can be calculated. The assumption is made that the color patches are all the same size and all the inks are in register to one another. The red, green and blue differentiated arrays are next searched in the area of each of the calculated color patch edges. The channel with the largest absolute peak will be the channel which is used to refine the location of this particular edge.

At this point, the rough location of the edge and the channel to be used are known. The running averaged version of the row for this channel is used to determine the precise location of the edge. The precise location of the edge is found by differentiating this array of data in the area of the edge. The differentiation is performed by subtracting points which are approximately one patch width apart. The location of the maximum absolute difference in the region of the rough peak location is taken as the precise edge location.

One further enhancement has been added to compensate for the fact that pixels near the edge might be contaminated by residual scattered light. The edges of the patch are selectively narrowed in the following way. To determine which pixels might be excluded, a ±20% limit is determined from each intensity level to the next. Pixels falling within the 20% limit are used for measurement of the color patch.

The above calculations are repeated for each of the edges 172 in the color bar 86. The result is the horizontal locations of the left and right edges of each of the color patches. The vertical boundaries 180, 182 are the same for all the color patches, and were the result of step 176.

In the preferred embodiment, the uncorrected captured image signal array 160 is used to determine the boundaries of each color patch in the color bar, although it is also contemplated that the filtered image signal array 168 be used instead.

When a system for monitoring color is first installed on a press the exact relationship between signals from the press and the appearance of the color bar under the camera may be unknown, or at least cumbersome to determine. One means for determining this system calibration is to program the computer 32 to act as a color bar searching circuit.

The color bar search algorithm begins by collecting an image at one candidate position, where position is taken to refer to a particular timing between press signals and strobe flash. This image is analyzed according to the previously disclosed algorithms to determine whether the image contains a valid color bar.

If the color bar has been found, its vertical position in the image is noted and the position is amended so as to bring the color bar 86 to the center of the image 204. This is the calibrated position which is to be used for subsequent image collection.

If the color bar is not found in the image, the position is incremented so as to collect an image which has partial overlap with the first image. The process is repeated until either the color bar is located, or the images have been collected which cover all positions on the impression cylinder 24. If the latter occurs, an error is reported.

Referring back to FIG. 6, computer 32 is also programmed to operate as an uneven white response correction circuit 190. This correction involves dividing, element by element, the filtered image signal array by a filtered white reference array 167. The filtered white reference array is generated from a captured white reference array by applying the photometric zero correction 162, the nonlinearity correction 164, and the scattered light correction circuits 166 to the captured white reference array 168. The white reference array may be an image of a uniform white reference tile, an image of a section of roller which has been uniformly whitened, or a portion of the web which has not been printed on. The uneven white response correction corrects for vignetting in the lens, nonuniformity of illumination across the field of view 56, and nonuniform camera pixel sensitivity.

If a portion of the web is imaged to create the white reference array 167, there is a side benefit that the densities calculated will be "paper reference" densities, rather than absolute densities. Paper reference densities are more useful in the printing industry since they more directly relate to ink film thickness.

To reduce errors due to variations in strobe intensity, it is contemplated to further use a white patch (120, 128) as a white reference.

Note that the location of each color patch (96–152) within the captured image signal array has been determined at this point. To minimize computations, uneven white response correction need only be performed on the relevant color patch elements of the filter corrected image signal array.

Once corrections have been performed, the elements corresponding to an individual color patch are averaged by spatial averaging circuit 194. Optionally, temporal averaging 196 may also be performed by obtaining several frames from the camera and averaging the reflectances computed for corresponding patches.

In the preferred embodiment, the size of the field of view is 2.0"×1.8" Multiple considerations go into the selection of the size of the field of view. The first consideration is the size of the color patches. The field of view must be small enough such that each individual color patch consists of multiple elements of the captured image signal array. This allows for multiple elements to be averaged and also allows for elements near the boundaries of the color patch to be disregarded. The second consideration is the pixel resolution of the camera. Increased camera resolution will allow for more pixels in the same field of view. A third consideration is the avoidance of moiré patterns between the CCD pixels and the halftone dots in the printed color bars. For any set of conditions of pixel resolution and halftone dot spacing, there will be a range for the field of view which should be avoided.

Finally, optical density D 202 may be calculated as $-\log[R]200$ for each of the color patches. The densities thus arrived at are further used in conventional computation. For example, the solid ink density and the density of the corresponding 50% patch (for example, 96 and 100 for black ink) are together used to compute dot gain; the solid ink density and the density of the corresponding 75% patch (for example, 96 and 98 for black ink) are together used to compute print contrast; the solid ink density of an overprint (for example, 122 for cyan) and the corresponding solid ink density 102 are used to compute trap. Together with solid ink density, the dot gain, print contrast and trap may be used for quality control of the print run, for diagnosis of printing conditions or for control of inking levels.

Although the preferred embodiment has been described, it is contemplated that the order of corrections may be varied. It is also contemplated that the process to find the individual color patches within an array may be performed on the filtered image signal array instead of on the uncorrected captured image signal array. It is also contemplated that the black bias reference array and/or the white reference array be decimated over a plurality of elements such that fewer data points need be stored. Also, it is contemplated that the black bias reference array and/or white reference array be generated by frame averaging over time several captured black reference arrays. It is also contemplated that some corrections may not be necessary for the level of required accuracy.

The system herein described is adequate for measurement of color on a single side of a web. In many applications, color measurement must be performed on both sides of a web. The invention described may be adapted to measure color on two sides of the web by replication of the entire system, by replication of the camera assembly above and below the web and the addition of a video multiplexer before the image capture circuitry, or by providing a camera positioning unit which is capable of positioning the camera assembly 36 on either side of the web.

We claim:

1. A method for monitoring color quality of a printed image printed on a substrate, the method comprising the steps of:

positioning a camera assembly to receive light reflected from the printed image on the substrate, the camera assembly including a means for producing a signal;

transmitting the signal from the camera assembly to a computer; and processing the signal in the computer, the step of processing the signal in the computer including the steps of digitizing the signal to produce a digitized array and correcting the digitized array for the effects of scattered light wherein the step of correcting the digitized array includes the step of digitally filtering the digitized array, and wherein the step of digitally filtering the digitized array includes the step of using an exponential function to model the optical response of the camera assembly.

2. A method as set forth in claim 1 wherein the step of processing the signal in the computer further includes the step of:

correcting the digitized array for photometric zero.

3. A method for monitoring color quality of a printed image as set forth in claim 1 wherein the step of digitally filtering the digitized array includes using an exponential infinite impulse response filter to produce a filtered array.

4. A method as set forth in claim 3 wherein the step of correcting the digitized array for the effects of scattered light further includes the step of subtracting the filtered array from the digitized array.

5. A method as set forth in claim 1 wherein the step of processing the signal in the computer further includes the step of finding a color patch portion located within the field of view of the camera, wherein said step of finding a color patch portion includes the step of locating the outer boundaries of said color patch portion.

6. A method as set forth in claim 5 wherein the step of finding the color patch portion located within the field of view of the camera includes the steps of:

(a) identifying at least one row which is part of the color patch portion;

(b) identifying the top and bottom rows of the color patch portion; and (c) determining the edges of each color patch portion.

7. An apparatus for monitoring color quality of a printed image printed on a substrate, the apparatus comprising:

a camera assembly positioned with respect to the substrate so as to receive light reflected from the printed image, the camera assembly including means for producing a signal, and a computer for receiving and processing a signal from the camera assembly, said computer including means for digitizing the signal to produce a digitized array and means for correcting the digitized array for the effects of scattered light, said means for correcting the digitized array including means for digitally filtering the digitized array, wherein said means for digitally filtering the digitized array includes means for modelling the optical response of the camera assembly using an exponential function.

8. An apparatus as set forth in claim 7 wherein the means for correcting the digitized array for the effects of scattered light includes means for correcting the digitized array for photometric zero.

9. An apparatus as set forth in claim 7 wherein the means for digitally filtering the digitized array includes an exponential infinite impulse response filter for producing a filtered array.

10. An apparatus as set forth in claim 9 wherein the means for correcting the digitized array for the effects of scattered light further includes means for subtracting the filtered array from the digitized array.

11. An apparatus as set forth in claim 7 wherein the computer further includes means for finding a color patch portion located within the field of view of the camera, wherein said means for finding a color patch portion includes locating the outer boundaries of said color patch portion.

12. An apparatus as set forth in claim 11 wherein the means for finding the color patch portion located within the field of view of the camera includes means for identifying at least one row which is part of the color patch portion, means for identifying the top and bottom rows of the color patch portion, and means for determining the edges of each color patch portion.

13. An apparatus for monitoring color quality of a printed image as set forth in claim 7 and further including means for illuminating the printed image, the means for illuminating including a circular Vromanoid reflector.

14. An apparatus for monitoring color quality of a printed image as set forth in claim 7 and further including means for illuminating the printed image, the means for illuminating including an apertured collimator.

15. A method for monitoring color quality of a printed image printed on a moving substrate, the method comprising the steps of:

illuminating the printed image on the moving substrate with a strobe light, positioning an image recording device to receive light reflected from the printed image on the moving substrate, the image recording device including a means for producing a signal; transmitting the signal from the image recording device to a computer; and processing the signal in the computer, the step of processing the signal in the computer including the steps of digitizing the signal to produce a digitized array and correcting the digitized array for the effects of scattered light, wherein the step of correcting the digitized array includes the step of digitally filtering the digitized array, and wherein the step of digitally filtering the digitized array includes the step of using an exponential function to model the optical response of the image recording device.

16. A method as set forth in claim 15 wherein the step of processing the signal in the computer further includes the step of correcting the digitized array for photometric zero.

17. A method as set forth in claim 15 wherein the step of digitally filtering the digitized array also includes the step of using an exponential infinite impulse response filter to produce a filtered array.

18. A method as set forth in claim 17 wherein the step of processing the signal in the computer further includes the step of subtracting the filtered array from the digitized array.

19. A method as set forth in claim 15 wherein the step of processing the signal in the computer further includes the step of finding a color patch portion located within the field of view of the image recording device, wherein said step of finding a color patch portion includes the step of locating the outer boundaries of said color patch portion.

20. A method as set forth in claim 19 wherein the step of finding the color patch portion located within the field of view of the image recording device includes the steps of:

(a) identifying at least one row which is part of the color patch portion;

(b) identifying the top and bottom rows of the color patch portion; and (c) determining the edges of each color patch portion.

21. An apparatus for monitoring color quality of a printed image printed on a moving substrate, the apparatus comprising:

means for illuminating the printed image on the moving substrate, said means for illuminating including a strobe light, a camera positioned with respect to the substrate so as to receive light reflected from the substrate, the camera including means for producing a signal, and a computer for receiving and processing a signal from the camera assembly, said computer including means for digitizing the signal to produce a digitized array and means for correcting the digitized array for the effects of scattered light, said means for correcting the digitized array including means for digitally filtering the digitized array, wherein said means for digitally filtering the digitized array includes means for modelling the optical response of the camera using an exponential function.

22. An apparatus as set forth in claim 21 wherein the means for correcting the digitized array for the effects of scattered light includes means for correcting the digitized array for photometric zero.

23. An apparatus as set forth in claim 21 wherein the means for correcting the digitized array for the effects of scattered light further includes an exponential infinite impulse response filter for producing a filtered array.

24. An apparatus as set forth in claim 23 wherein the means for correcting the digitized array for the effects of scattered light further includes means for subtracting the filtered array from the digitized array.

25. An apparatus as set forth in claim 21 wherein the means for processing the signal in the computer further includes means for finding a color patch portion located within the field of view of the camera, wherein said means for finding a color patch portion includes locating the outer boundaries of said color patch portion.

26. An apparatus as set forth in claim 25 wherein the means for finding the color patch portion located within the field of view of the camera includes means for identifying at least one row which is part of the color patch portion, means for identifying the top and bottom rows of the color patch portion, and means for determining the edges of each color patch portion.

27. An apparatus as set forth in claim 21 wherein said means for illuminating the printed image includes a circular Vromanoid reflector.

28. An apparatus as set forth in claim 21 wherein said means for illuminating the printed image includes an apertured collimator.

29. A method for monitoring color quality of a printed image as set forth in claim 1, wherein the step of correcting the digitized array also includes the step of performing the mathematical operation of convolution between the digitized array and the exponential function.

30. An apparatus for monitoring color quality of a printed image as set forth in claim 7, wherein said means for correcting the digitized array further includes means for performing the mathematical operation of convolution between the digitized array and the exponential function.

* * * * *